Patented Feb. 3, 1931

1,790,918

UNITED STATES PATENT OFFICE

MAX HAUSER, OF ZURICH, SWITZERLAND

METHOD OF PRODUCING CERAMIC VESSELS

No Drawing. Application filed April 13, 1927, Serial No. 183,618, and in Switzerland April 28, 1926.

The present invention relates to a process for preparing ceramic products in which ceramic raw materials are mixed with metal or alloy, in a finely divided or granular state and the mixture is shaped and fired.

It has been proposed to employ metals such as aluminium, magnesium, or zinc, or alloys or mixtures thereof, as metallic constituents in such process in order that, owing to the action of the metal or metals, the ceramic mixture may be quickly dried before firing.

The object of the present invention is to prepare ceramic products having improved mechanical, thermal and chemical properties, as distinct from a mixture which may be quickly dried before firing, and it is an essential feature of the invention that the metal remains present in the finished article in a metallic or uncombined state and that the metal does not form any combination as a result of the firing process. With the invention adequate precaution is taken to insure that the finished product contains the metal in the metallic or uncombined state.

Those metals, alloys and metal mixtures are suitable for my method which have a high fusion point i. e. near 1000° C. or above, such as iron, nickel, copper, chromium, manganese, tungsten and so forth, alloys such as ferrochrome, ferromanganese, ferrotungsten, ferrosilicon, and ferroaluminium. It is also possible to use mixtures of such metals and alloys with silicon or ferrosilicon. As ceramic raw materials there are used natural silicates such as clay, china-clay kaolin, feldspar, cornish-stone, steatite, quartz flint or oxides such as magnesia, zirconium oxide, alumina as also auxiliary substances, such as boric acid, borates, alkali silicates, alkaline earth carbonates, frits, glasses, etc., particularly however, mixtures of such materials according to the method of using such masses in the ceramic industry.

The bodies thus produced possess valuable properties as regards their mechanical, thermal, electrical and chemical behaviour. They may be varied within wide limits and suited to the purpose in view by suitable selection and combination of the different raw materials.

In contradistinction to ceramic products the metals possess a higher heat conductivity and partly also greater toughness. By the addition of metals to ceramic masses there are obtained products having a higher heat conductivity and partly also greater toughness than is the case with the usual ceramic products. They are used with advantage where it is necessary to heat or cool, therefore for cooking vessels, coolers and the like. These metal ceramic products in addition to the higher heat conductivity also exhibit a higher resistance to sudden changes in temperature in comparison with ordinary ceramic materials, such as porcelain or stone-ware, which fracture on sudden heating.

A few highly refractory products, such as magnesia or zirconium oxide are extremely sensitive to sudden changes in temperature. This disadvantage is considerably reduced if highly fusible metals such as tungsten, tantalum or the like are added to such masses.

A number of alloys and compounds of metals amongst themselves, such as tungsten-silicon and chromium-silicon of substantially the composition $Cr_2Si$ exhibit a very great hardness and form a valuable material for grinding discs. They are reduced to a suitable size of grain, mixed with ceramic material and the discs formed thereof are hardened by heating to a high temperature.

Magnets are produced from metals and alloys having good magnetic properties in the manner that they are mixed with ceramic materials, shaped and burnt. If there is a sufficient quantity of non-conducting material in the mixture the magnets thus produced are electrically non-conducting and free from eddy currents.

There are further a large number of metals and alloys with valuable properties which from the fire molten condition solidify in a coarse crystalline form and from which no useful castings can be obtained by casting. This, for example is the case of ferrosilicon, ferrochromium with a high content of chromium and a whole number of other alloys. These can be usefully employed if, according to the invention, they are worked into shaped bodies in the pulverulent form with ceramic raw material.

The burning process requires particular precautions when metals are used which oxidize at high temperatures. This, for example, is the case with copper, iron, nickel, chromium, tungsten etc., and corresponding alloys and metal mixtures. As the furnaces used in the ceramic industry always contain larger or smaller quantities of air in addition to the fire gases during the burning process, which oxidize the metals, the heating is effected in vacuo or in furnaces in which a reducing or otherwise oxygen free atmosphere is maintained. This, for example, is possible in a closed furnace heated electrically by graphite rods and other resistances, from which the air can be expelled by another gas such as nitrogen, carbonic acid, carbon monoxide, hydrogen or a hydrocarbon.

In order to produce, for example, an iron-containing body there are mixed together 70 parts by weight iron powder, 20 parts by weight clay, 5 parts by weight kaolin, 5 parts by weight feldspar, moistening with water, shaping, rapidly drying and burning in an atmosphere of hydrogen at 1050–1150°.

Instead of composing the metal-containing mass in such a manner that it sinters readily it is sufficient in many cases to coat the article shaped therefrom, before sintering, with a layer of a ceramic material which sinters at a comparatively low temperature. In many cases the bodies are sufficiently protected during burning if they are coated with a layer of a material (for example glaze) which compactly sinters below the temperature at which the metallic portion oxidizes. The shaped bodies may also be enclosed during the burning process in containers filled with carbon or closed air-tight.

The degree of the burning temperature depends upon the composition of the material and upon whether porous or compact products are to be produced; it however always lies below the fusion point of the metal used.

The bodies produced according to this process are dark coloured or possess a metal gloss according to their composition and treatment. If they contain a sufficient percentage of soft metal they can be worked like castings. They may be enamelled or glazed like ceramic bodies. The glaze may be applied to the unburnt or preliminarily burnt bodies or it may be burnt on the finished body.

Ceramic bodies may also produced of which only parts or layers contain metal. Metal powders may be used in glazes and colours.

What I wish to secure by U. S. Letters Patent is:—

1. The process of making ceramic vessels having toughness and high heat conductivity which includes mixing a ceramic raw material and a chromium alloy, shaping the mixture to the desired form and firing.

2. The process of making ceramic products characterized by toughness and relatively high heat conductivity which includes mixing a ceramic raw material, a metal in finely sub-divided state and silicon, shaping the product to the desired form and firing.

3. The process of making a ceramic product characterized by toughness and relatively high heat conductivity which includes mixing a ceramic raw material, a chromium alloy and silicon, shaping the mixture to the desired form and firing.

4. The process of making a ceramic product characterized by toughness and relatively high heat conductivity, including mixing a ceramic raw material, ferro-chromium and silicon, shaping the mixture to the desired form and firing.

5. The process of making a ceramic product characterized by toughness and relatively high heat conductivity, including mixing a ceramic raw material, ferro-chromium and silicon, shaping the mixture to the desired form, coating with a material sintering below the temperature at which said ferro-chromium oxidizes and heating to the sintering point of said material.

6. The process of making a ceramic product characterized by toughness and relatively high heat conductivity, including mixing a ceramic raw material, metal and silicon, shaping the mixture to the desired form, coating with a material sintering below the temperature at which said metal oxidizes and heating to the sintering point of said material.

In testimony whereof I affix my signature.

Dr. MAX HAUSER.